US006953638B2

(12) United States Patent
Inui et al.

(10) Patent No.: US 6,953,638 B2
(45) Date of Patent: Oct. 11, 2005

(54) FLUID-COOLED BATTERY PACK SYSTEM

(75) Inventors: Kiwamu Inui, Aichi (JP); Toyohiko Etoh, Aichi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/819,434

(22) Filed: Mar. 28, 2001

(65) Prior Publication Data

US 2001/0026886 A1 Oct. 4, 2001

(30) Foreign Application Priority Data

Mar. 31, 2000 (JP) ....................................... 2000-096946

(51) Int. Cl.[7] ............................................... H01M 10/50
(52) U.S. Cl. ........................ 429/120; 429/149; 429/152
(58) Field of Search ................................ 429/120, 149, 429/152

(56) References Cited

U.S. PATENT DOCUMENTS

| | | | | |
|---|---|---|---|---|
| 5,456,994 A | * 10/1995 | Mita | .......................... | 429/120 |
| 5,585,204 A | * 12/1996 | Oshida et al. | .............. | 429/120 |
| 5,879,831 A | 3/1999 | Ovshinsky et al. | | |

FOREIGN PATENT DOCUMENTS

| | | | |
|---|---|---|---|
| EP | 692 838 | 1/1996 | |
| EP | 834 952 | 4/1998 | |
| WO | 98 31059 | 7/1998 | |
| WO | WO 98/31059 | * 7/1998 | ............ H01M/2/10 |

* cited by examiner

*Primary Examiner*—Dah-Wei Yuan
(74) *Attorney, Agent, or Firm*—Hamre, Schumann, Mueller & Larson, P.C.

(57) ABSTRACT

A fluid-cooled battery pack system can maintain the variation in battery temperature in a battery pack within the permissible temperature range even when the variation in the gaps between battery modules is considered. A plurality of battery modules are each provided with a plurality of convex portions and concave portions on the sides thereof, where the connections to other battery modules are made. When the battery modules are connected by bringing the opposite convex portions into contact with each other, coolant flow paths, through which a coolant flows, are formed. The target width of the coolant flow paths is set so that the variation in temperature relative to the target temperature of each battery module is maintained within a predetermined range when the coolant flows through the coolant flow paths; the variation in temperature is caused by a fabrication tolerance relative to the target width of the coolant flow paths between the battery modules.

18 Claims, 6 Drawing Sheets

FLUID-COOLED BATTERY PACK SYSTEM

BACKGROUND OF THE INVENTION

1. Field of the Invention

The present invention relates to a cooling technology for a battery pack including a plurality of battery modules connected in series or in parallel, particularly, to a cooling technology for secondary batteries used in hybrid electric vehicles (HEVs) or pure electric vehicles (PEVs).

2. Description of the Related Art

Secondary batteries are of various types: lead-acid batteries, nickel-cadmium (Ni—Cd) batteries, nickel-metal-hydride (Ni—MH) batteries, and lithium ion batteries. After being discharged, these batteries can be recharged by a predetermined electric current supplied from an external power source. Such characteristics allow them to be used in various kinds of equipment. For example, batteries have been used in vehicles to deliver power to the spark plug of an engine.

In recent years, a Ni—MH battery has been used largely as a main power source for driving electric motors in a pure electric vehicle (PEV) and a so-called hybrid electric vehicle (HEV), which includes an engine and electric motor. This is because a Ni—MH battery has high energy density, i.e., it can store the energy in a compact manner, and high power density. To deliver sufficient power to their electric motors, PEVs and HEVs employ battery packs; a battery pack is built by combining a plurality of cells into a battery module and connecting two or more battery modules in series or in parallel.

In a Ni—MH battery, which is formed by combining a plurality of battery modules and used in PEVs and HEVs, a large charge/discharge current flows repeatedly because of braking, acceleration, or the like of the vehicle during driving. This causes $I^2R$ losses due to the internal resistance of the Ni—MH battery, resulting in heat generation in the battery.

Compared with a lead-acid battery having a large weight, a Ni—MH battery provides high energy density, i.e., it can store the energy in a compact manner. Thus, a plurality of battery modules can be combined compactly. However, such a structure makes heat dissipation in the Ni—MH battery more difficult than that in the lead-acid battery.

To solve the above problems, the method in which a battery is cooled by forcing a coolant, such as air or the like, into the gaps between battery modules is known. In this case, cooling performance can be improved by narrowing the gaps between battery modules and increasing the flow velocity of the coolant.

For example, U.S. Pat. No. 5,879,831 proposes a method for determining the optimum dimensions of the gaps between battery modules in cooling design, focusing on the fact that making the gaps narrower than necessary increases the flow resistance and reduces the flow rate, which results in poor cooling performance.

However, the gap dimensions determined by this method are often reduced to such an extent that machining accuracy becomes more important. In that case, the variation in the gap dimensions causes non-uniform cooling in the battery pack.

Furthermore, the non-uniform cooling causes unbalanced battery capacity, and thus the available area of the battery is limited. In a worst case, this might lead to serious trouble, e.g., the vehicle breaks down on the road.

SUMMARY OF THE INVENTION

Therefore, with the foregoing in mind, it is an object of the present invention to provide a fluid-cooled battery pack system that can maintain the variation in battery temperature in a battery pack within the permissible temperature range even when the variation in the gaps between battery modules is considered.

To achieve the above object, a fluid-cooled battery pack system of the present invention includes a battery pack case, a battery pack, and a coolant transport device. The battery pack case has at least one coolant inlet and at least one coolant outlet. The battery pack is placed in the battery pack case and provided with a plurality of battery modules, each including at least one cell, connected in series or in parallel and coolant flow paths formed for each battery module between the adjacent modules or between the module and a battery pack structure, the coolant flow paths allowing a coolant to pass from the coolant inlet to the coolant outlet. The coolant transport device introduces the coolant into the coolant inlet, allows it to flow through the coolant flow paths, and releases it from the coolant outlet. The target width of the coolant flow paths is set so that the variation in temperature between the battery modules caused by a fabrication tolerance relative to the target width of the coolant flow paths is maintained within a predetermined range and all the battery modules have a predetermined temperature or less when the coolant flows through the coolant flow paths.

In the fluid-cooled battery pack system, it is preferable that the target width of the coolant flow paths is set so that the coolant flow paths have the upper limit of the value of flow resistance or less, which allows the variation in temperature between the battery modules to be maintained within the predetermined range.

In the fluid-cooled battery pack system, it is preferable that the target width of the coolant flow paths is set so that at least one factor selected from a container material for the battery modules and battery input/output conditions is taken into account. In this case, the container material may be a resin material or the like.

In the fluid-cooled battery pack system, it is preferable that spacers made of metal or resin are provided, each of which is interposed between the opposite battery modules in the battery pack case, and that the gaps between the battery modules formed by the spacers act as the coolant flow paths.

In the fluid-cooled battery pack system, it is preferable that the battery modules in the battery pack case include a battery holder that holds the battery modules so as to be spaced at a certain distance apart, and that the gaps between the battery modules formed by the battery holder act as the coolant flow paths.

In the fluid-cooled battery pack system, it is preferable that each of the battery modules in the battery pack case has a plurality of concave and convex portions on the sides opposed to other battery modules, and when the battery modules are connected by bringing the opposite convex portions into contact with each other, the gaps between the battery modules formed by the concave portions act as the coolant flow paths.

In the fluid-cooled battery pack system, it is preferable that the convex and concave portions of each battery module extend in the direction parallel to the flow of the coolant and form a plurality of fluid flow paths between the battery modules.

Alternatively, it is preferable that the convex portions of each battery module are spaced at a predetermined distance apart on the sides of the module, where the connections to other battery modules are made.

It is preferable that the fluid-cooled battery pack system further includes an upper coolant chamber located above the battery modules and a lower coolant chamber located under the battery modules in the battery pack case.

Also, it is preferable that the difference in pressure between the upper coolant chamber and the lower coolant chamber causes the coolant to flow through the coolant flow paths.

In the fluid-cooled battery pack system, it is preferable that the target width of the coolant flow paths is set so that when a high load is needed, the battery modules have a maximum temperature of 55° C. or less and the variation in temperature between the battery modules is 10° C. or less.

In the fluid-cooled battery pack system, it is preferable that the coolant is a gaseous coolant with electrical insulating characteristics.

In this case, the gaseous coolant preferably is air.

Alternatively, it is preferable that the coolant is a liquid coolant with electrical insulating characteristics.

In the fluid-cooled battery pack system, it is preferable that the coolant transport device includes a cooling fan.

In this case, the cooling fan preferably is placed at the coolant inlet and supplies fresh air into the battery pack case.

Alternatively, the cooling fan preferably is placed at the coolant outlet and draws heated air out of the battery pack case.

The above structures can maintain the variation in battery temperature in a battery pack within the permissible temperature range. Therefore, even when the variation in the gaps between battery modules or between the battery module and a battery pack structure, which is the variation in width of coolant flow paths during manufacturing, is considered, those structures are useful in dealing with unbalanced battery capacity, so that the capability of the battery can be utilized fully.

Furthermore, it is possible to design a battery pack system while considering the tolerance of the width of the coolant flow paths. Thus, the manufacturing cost or the like can be minimized.

In addition, the dimensions of the coolant flow paths are designed in such a manner that the difference in internal pressure between battery modules and the amount of expansion of a container have been estimated based on a container material for the battery modules, battery input/output conditions, or the like so as to be incorporated in the design. This can provide useful design for machining accuracy during manufacturing as well as different types of variations when the battery pack is put into use after fabrication.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the accompanying drawings.

First Embodiment

Figure 1A:
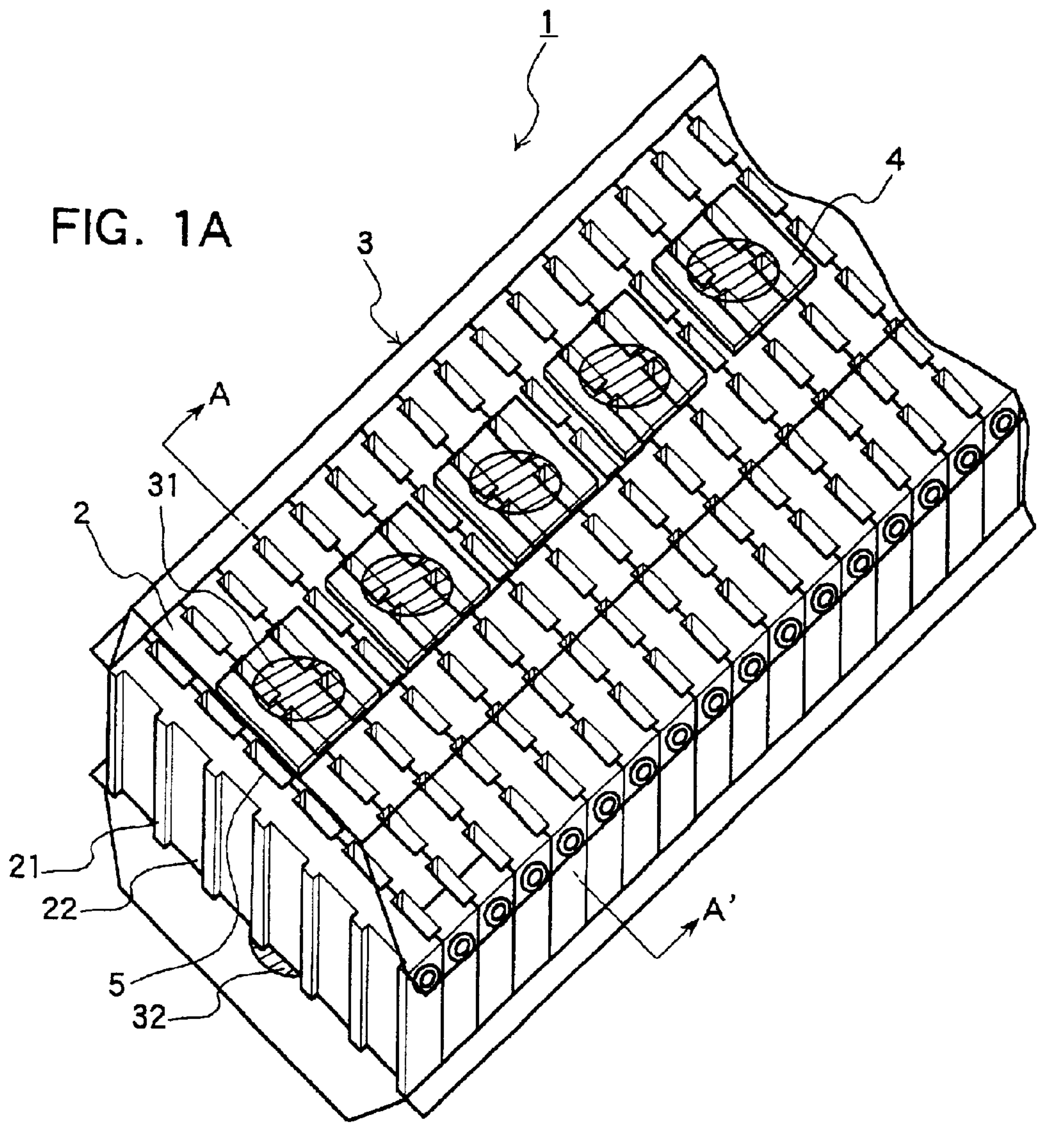
FIG. 1A is a schematic perspective view partially showing a configuration of a fluid-cooled battery pack system according to a first embodiment of the present invention.
Figure 1B:
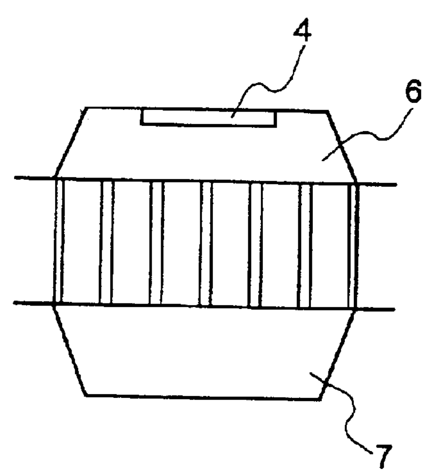
FIG. 1B is a cross-sectional view taken on line A–A' of FIG. 1A.

FIG. 1A is a schematic perspective view partially showing a configuration of a fluid-cooled battery pack system according to a first embodiment of the present invention. FIG. 1B is a cross-sectional view taken on line A–A' of FIG. 1A. In FIG. 1A, a member 3 (battery pack case) is drawn to be transparent for the purpose of showing the components of a fluid-cooled battery pack system clearly.

In FIG. 1, numeral 1 indicates a fluid-cooled battery pack system of this embodiment. Numeral 2 indicates a battery module including many Ni—MH cells connected in series. The battery pack is made up of many battery modules 2 electrically connected in series. The required number of Ni—MH cells is determined in accordance with the predetermined power to be delivered to HEV/PEV electric motors.

The battery module 2 has a plurality of convex portions 21 and concave portions 22 on the sides thereof, where the connections to other battery modules are made. The battery modules 2 are connected by bringing the opposite convex portions into contact with each other. When these convex portions 21 are joined to connect the modules, cooling slits 5 (coolant flow paths) are formed between the battery modules 2 by the concave portions 22.

Numeral 3 indicates a battery pack case that houses the battery pack, in which many battery modules are connected together, and has the function of cooling the battery pack forcibly. The battery pack case 3 has inlets 31 (coolant inlets) and outlets 32 (coolant outlets). The inlets 31 are provided on the top face of the battery pack case 3, through which fresh air enters as a coolant; the outlets 32 are provided on the bottom face thereof, through which the air inside the case comes out.

Furthermore, cooling fans 4 are attached near the inlets 31 of the battery pack case 3. As shown in FIG. 1B, the air forced through the inlets 31 with the cooling fans 4 enters an upper air chamber 6 (upper coolant chamber) located above the battery modules 2 and flows through the cooling slits 5 between the battery modules into a lower air chamber 7 (lower coolant chamber) located under the battery modules 2. Then, the air is released from the outlets 32 of the battery pack case 3. In other words, the difference in pressure between the upper air chamber 6 and the lower air chamber 7 causes the air to flow through the cooling slits 5, and thus the battery modules 2 are cooled.

Next, the method for forming the cooling slits between the battery modules will be described.

Figure 2A:
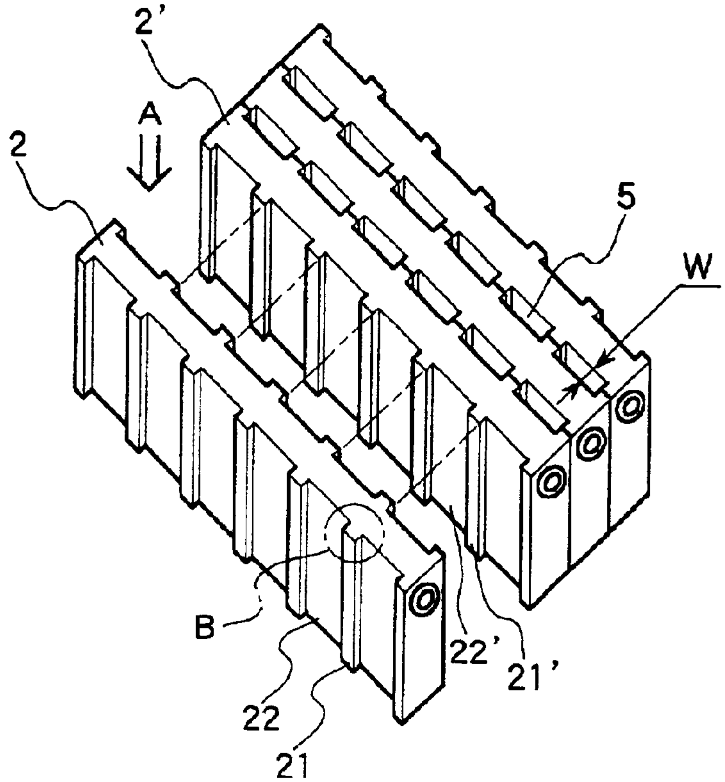
FIG. 2A is a perspective view showing a method for assembly of battery modules according to a first embodiment of the present invention.
Figure 2B:
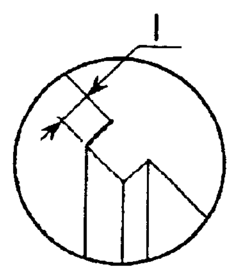
FIG. 2B is an enlarged view of a portion B encircled in FIG. 2A.

FIG. 2A is a perspective view showing a method for assembly of battery modules, and FIG. 2B is an enlarged view of a portion B encircled in FIG. 2A.

In FIGS. 2A and 2B, the battery module 2 has convex portions 21 and concave portions 22 on the sides thereof, where the connections to other battery modules are made. Those convex and concave portions extend in the direction parallel to the airflow direction A. When the battery module 2 is connected to another battery module 2' that has been built into a battery module assembly, the convex portions 21 of the battery module 2 come into contact with the opposite convex portions 21' of the battery module 2'. Since the amount of protrusion 1 of the convex portions 21 is the same as that of the depression of the concave portions 22, a width W of the cooling slits 5 between the battery modules 2 is 21.

In this embodiment, the fabrication tolerance of the convex portions 21 is set to ±0.05 mm of the design target value of the protrusion 1. Therefore, the fabrication tolerance of cooling slit width W becomes ±0.1 mm.

Next, the cooling performance of the cooling slits 5 having the above fabrication tolerance will be described.

Figure 3:
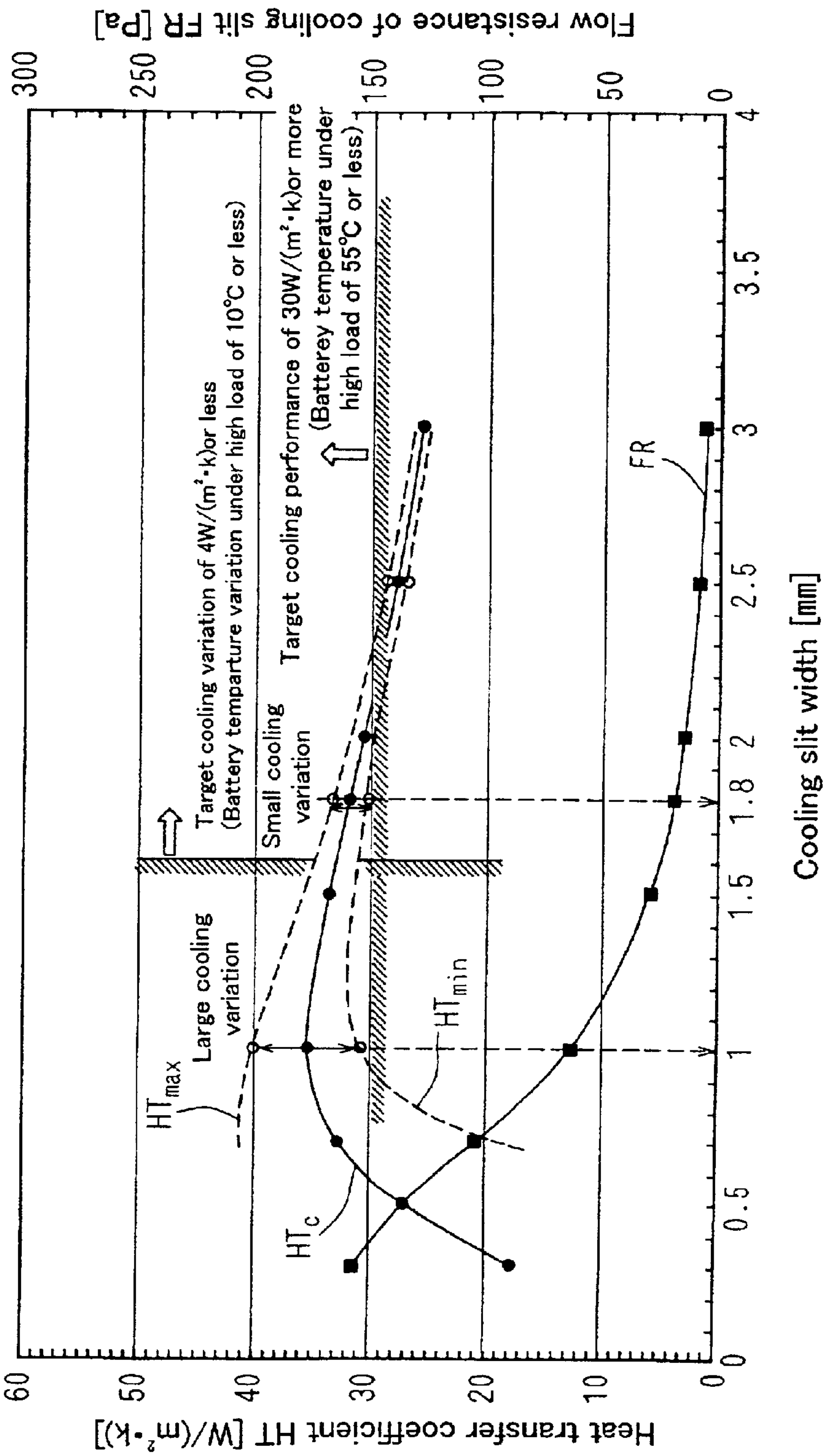
FIG. 3 is a graph showing the relationship of heat transfer coefficient and flow resistance to a cooling slit width between battery modules.

FIG. 3 is a graph showing the curves of heat transfer coefficient and flow resistance over the design target value of a cooling slit width between the battery modules 2. In FIG. 3, the cooling performance of the battery modules 2 is expressed by heat transfer coefficient.

The curve HTc represents a heat transfer coefficient when the fabrication tolerance of a cooling slit width is zero, i.e., a cooling slit width is the design target value. The curve HTmax represents a heat transfer coefficient when the fabrication tolerance of a cooling slit width is a maximum, i.e., a cooling slit width is ±0.1 mm of the design target value. The curve HTmin represents a heat transfer coefficient when the fabrication tolerance of a cooling slit width is a minimum, i.e., a cooling slit width is −0.1 mm of the design target value.

As is indicated by the curve HTc, the velocity of airflow increases as a cooling slit width is reduced, so that a heat transfer coefficient is raised, i.e., the cooling performance is improved. However, an excessive reduction in a cooling slit width increases a flow resistance represented by the curve FR, so that a heat transfer coefficient is decreased, i.e., the cooling performance is lowered.

Furthermore, the fabrication tolerance has a larger effect on cooling performance as a cooling slit width is reduced, so that the range of the variation in cooling performance is enlarged, as is indicated by the curves HTmax and HTmin.

In the conventional system described above, the optimum cooling slit width is determined while considering a flow resistance. In other words, the optimum cooling slit width is 1.0 mm, at which the curve HTc has its peak. However, assuming that the target value of a cooling slit width is 1.0 mm and the battery modules are processed with the fabrication tolerance of ±0.1 mm, the range of the variation in cooling performance is enlarged, as is indicated by the curves HTmax and HTmin. This results in the variation in temperature of the battery modules.

On the other hand, as shown in FIG. 3, this embodiment sets the target cooling performance (heat transfer coefficient) to 30 W/($m^2$·K) or more, i.e., a battery temperature in the application of a high load is 55° C. or less, and the target cooling variation (the difference between HTmax and HTmin) to 4 W/($m^2$·K) or less, i.e., a battery temperature variation in the application of a high load is 10° C. or less. Therefore, the effect on cooling performance can be minimized, as long as the design target value of a cooling slit width is in the range of 1.6 mm to 1.9 mm. Thus, even if the battery modules are processed with the fabrication tolerance of ±0.1 mm of a cooling slit width, the problem of the variation in temperature of the battery modules can be eliminated.

The battery temperature of 55° C. or less in the application of a high load is the temperature at which a battery can provide 80% or more of its rated capability. Also, the battery temperature variation of 10° C. or less in the application of a high load means the temperature range in which a battery pack can provide the optimum performance.

In this embodiment, the design target value of a cooling slit width is set to 1.8 mm, which is in the range of 1.6 mm to 1.9 mm.

Second Embodiment

Figure 4A:
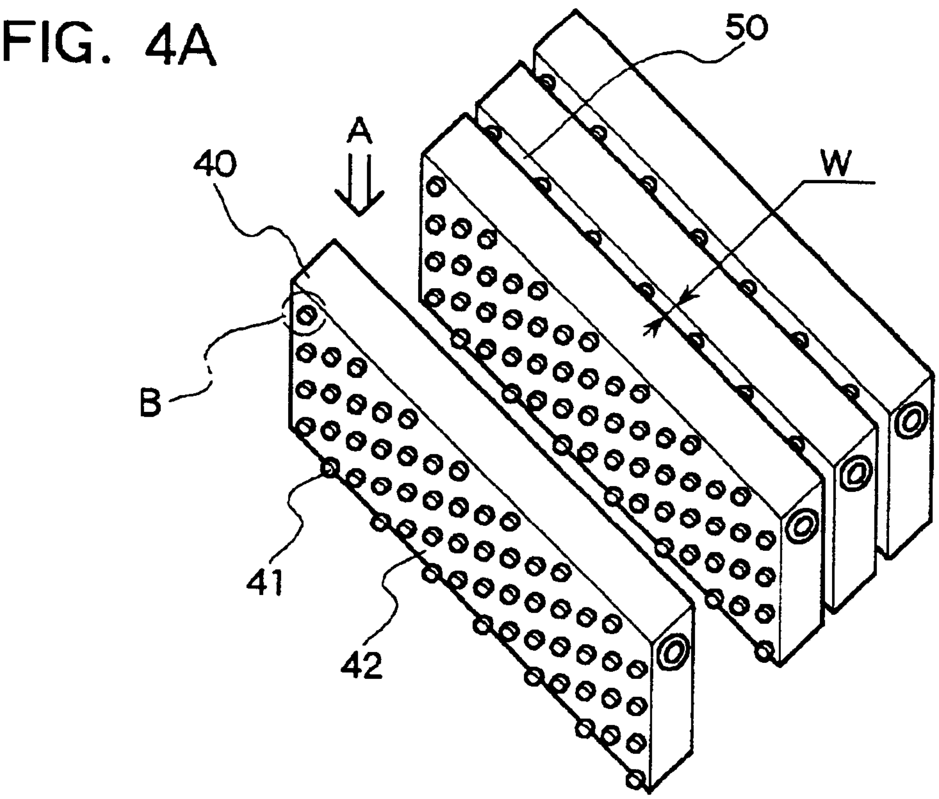
FIG. 4A is a perspective view showing a method for assembly of battery modules according to a second embodiment of the present invention.
Figure 4B:
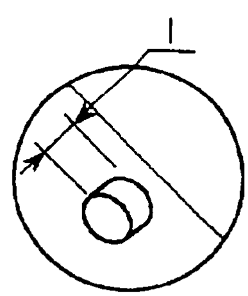
FIG. 4B is an enlarged view of a portion B encircled in FIG. 4A.

FIG. 4A is a perspective view showing a method for assembly of battery modules according to a second embodiment of the present invention. FIG. 4B is an enlarged view of a portion B encircled in FIG. 4A.

In FIG. 4, a battery module 40 has projections 41 that are spaced at a predetermined distance apart on the sides thereof, where the connections to other battery modules are made. Numeral 42 indicates a flat portion of those sides other than the projections 41. When the battery module 40 is connected to another battery module 40' that has been built into a battery module assembly, the projections 41 of the battery module 40 come into contact with the opposite projections 41' of the battery module 40'.

Third Embodiment

Figure 5:
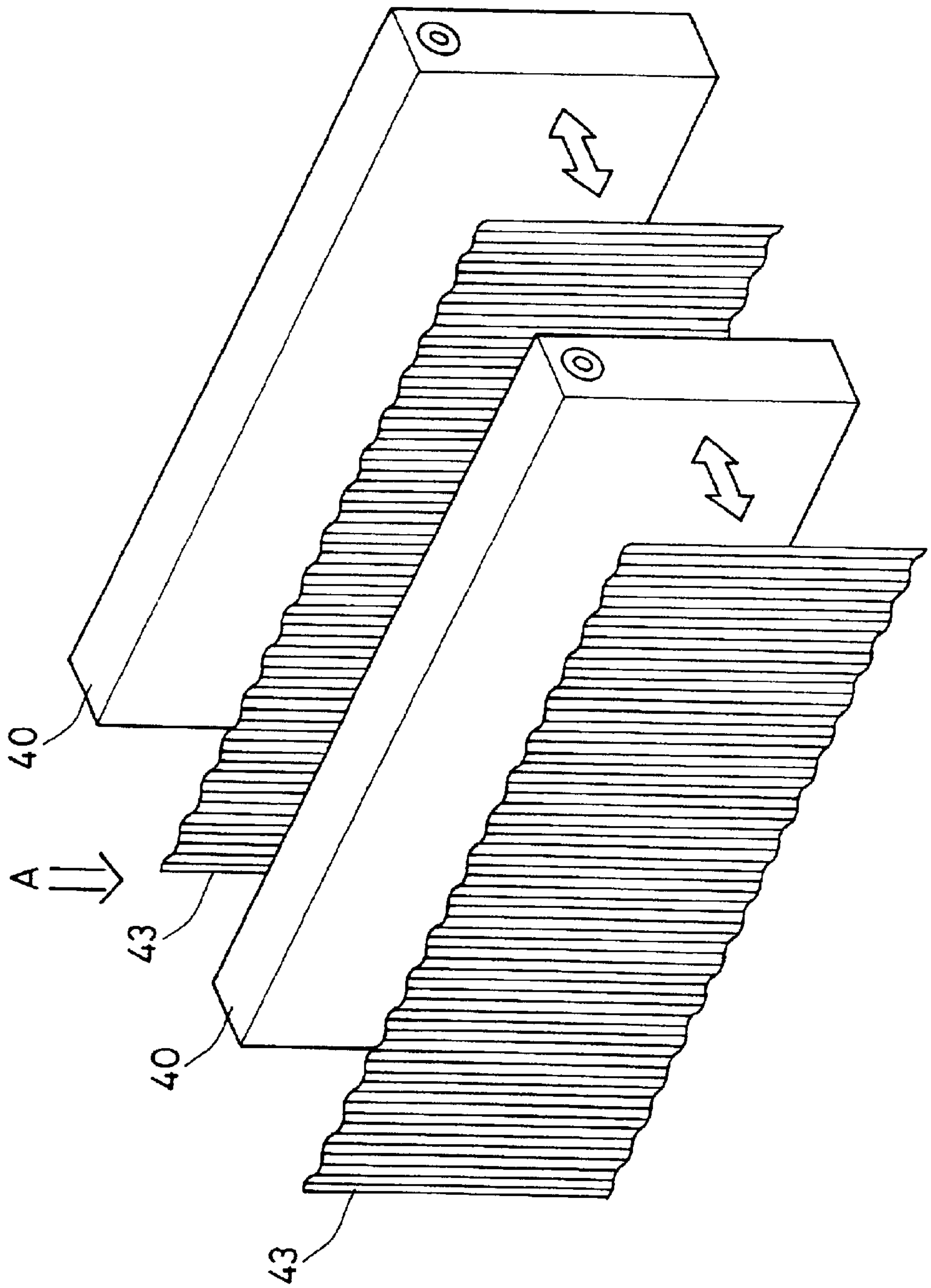
FIG. 5 is a perspective view showing a method for assembly of battery modules according to a third embodiment of the present invention.

FIG. 5 is a perspective view showing a method for assembly of battery modules according to a third embodiment of the present invention.

In FIG. 5, this system includes spacers 43 in the form of a corrugated plate made of metal or resin, each of which is interposed between the opposite battery modules 40 to be connected together. The gaps are formed between the spacer 43 and the battery modules 40, acting as coolant flow paths.

The form of the spacer 43 is not limited to a corrugated plate, and the spacer may have any form that allows the coolant flow paths to be formed between the battery modules 40.

Fourth Embodiment

Figure 6:
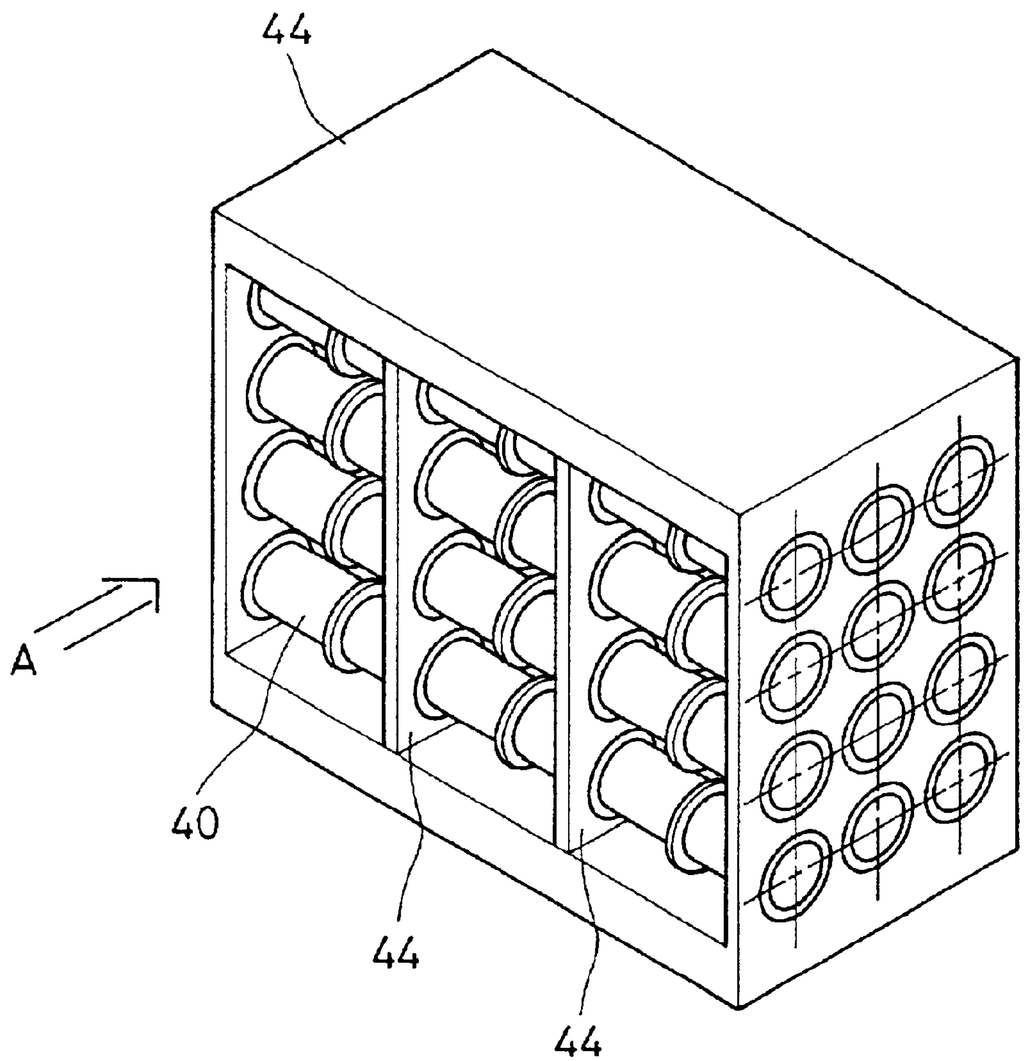
FIG. 6 is a perspective view showing a configuration of battery modules according to a fourth embodiment of the present invention.

FIG. 6 is a perspective view showing a configuration of battery modules according to a fourth embodiment of the present invention.

In FIG. 6, each battery module 40 includes six cylindrical cells connected together and is held by a battery holder 44. In addition, the battery holder 44 determines the positions of the battery modules 40. Coolant flow paths are formed by the gaps between the battery modules 40, which are defined by the battery holder 44, and/or the gaps between the top and bottom of the battery holder 44 and the battery modules 40.

This embodiment provides an example of a battery holder for the cylindrical battery modules. However, various types of battery holders or battery pack structures can be used depending on the form of the battery modules, as long as they hold the battery modules and define the coolant flow paths.

Other Embodiments

In other embodiments of the present invention, when a resin or the like is used as a material for a container of a Ni—MH battery, the container expands because of the difference in internal pressure between the cells in battery modules, which may cause a variation in cooling slit width. Thus, besides the above embodiments, the difference in internal pressure and the coefficient of expansion of the container have been estimated based on a container material, battery input/output conditions, or the like so as to be incorporated in the setting of a cooling slit width. This embodiment can provide useful design for machining accuracy during manufacturing as well as different types of variations when the battery pack is put into use after fabrication.

In the embodiments of the present invention, the cooling fans 4 are attached near the inlets 31 of the battery pack case 3. However, the present invention is not limited thereto. For example, the cooling fans 4 can be attached near the outlets 32 to draw the air out of the outlets 32. This causes the difference in pressure between the upper air chamber 6 and the lower air chamber 7, which can produce the airflow in the cooling slits 5. Alternatively, the cooling fans can be attached both to the inlets 31 and the outlets 32.

In the embodiments of the present invention, the inlets 31 for introducing fresh air are provided on the top face of the battery pack case 3 and the outlets 32 for releasing the air in the battery pack are provided on the bottom face thereof, so that the battery modules are cooled by the air flowing up and down. However, the inlets and outlets can be provided on the sides of the battery pack case 3.

In the embodiments of the present invention, the battery modules 2 are cooled by the air using the cooling fans 4. However, the battery modules 2 can be cooled by other coolant transport devices using a gaseous coolant other than air or a liquid coolant.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A fluid-cooled battery pack system comprising:

a battery pack case having at least one coolant inlet and at least one coolant outlet;

a battery pack placed in the battery pack case and provided with a plurality of battery modules connected electrically in series or in parallel, each battery module including at least one cell and having edge portions with dimensions that vary in a thickness direction within a predetermined tolerance, and coolant flow paths formed for each battery module between the adjacent modules or between the module and a battery pack structure, the coolant flow paths allowing a coolant to pass from the coolant inlet to the coolant outlet, the width of the coolant flow paths being determined by the thickness dimensions of the edge portions; and a coolant transport device for introducing the coolant into the coolant inlet, allowing it to flow through the coolant flow paths, and releasing it from the coolant outlet, wherein a target width of the coolant flow paths is set so that a variation in temperature between the battery modules caused by the predetermined tolerance relative to the target width of the coolant flow paths is maintained within a predetermined range and all the battery modules have a predetermined temperature or less when the coolant flows through the coolant flow paths, and the thickness direction of the edge portions is parallel to the width of the coolant flow paths.

2. The fluid-cooled battery pack system according to claim 1, wherein the target width of the coolant flow paths is set so that the coolant flow paths have an upper limit of a value of flow resistance or less, which allows the variation in temperature between the battery modules to be maintained within the predetermined range.

3. The fluid-cooled battery pack system according to claim 1, wherein the target width of the coolant flow paths is set so that at least one factor selected from a container material for the battery modules and battery input/output conditions is taken into account.

4. The fluid-cooled battery pack system according to claim 3, wherein the container material is a resin material.

5. The fluid-cooled battery pack system according to claim 1, wherein spacers made of metal or resin are provided, each of which is interposed between opposite battery modules in the battery pack case, and gaps between the battery modules formed by the spacers act as the coolant flow paths.

6. The fluid-cooled battery pack system according to claim 1, wherein the battery modules in the battery pack case include a battery holder that holds the battery modules so as to be spaced at a certain distance apart, and gaps between the battery modules formed by the battery holder act as the coolant flow paths.

7. The fluid-cooled battery pack system according to claim 1, wherein each of the battery modules in the battery pack case has a plurality of concave and convex portions on the sides opposed to other battery modules, and when the battery modules are connected by bringing the opposite convex portions into contact with each other, gaps between the battery modules formed by the concave portions act as the coolant flow paths.

8. The fluid-cooled battery pack system according to claim 7, wherein the convex and concave portions of each battery module extend in a direction parallel to a flow of the coolant and form a plurality of fluid flow paths between the battery modules.

9. The fluid-cooled battery pack system according to claim 7, wherein the convex portions of each battery module are spaced at a predetermined distance apart on the sides of the module, where connections to other battery modules are made.

10. The fluid-cooled battery pack system according to claim 1, further comprising an upper coolant chamber located above the battery modules and a lower coolant chamber located under the battery modules in the battery pack case.

11. The fluid-cooled battery pack system according to claim 10, wherein a difference in pressure between the upper coolant chamber and the lower coolant chamber causes the coolant to flow through the coolant flow paths.

12. The fluid-cooled battery pack system according to claim 1, wherein the target width of the coolant flow paths is set so that when a high load is needed, the battery modules have a maximum temperature of 55° C. or less and the variation in temperature between the battery modules is 10° C. or less.

13. The fluid-cooled battery pack system according to claim 1, wherein the coolant is a gaseous coolant with electrical insulating characteristics.

14. The fluid-cooled battery pack system according to claim 1, wherein the coolant is a liquid coolant with electrical insulating characteristics.

15. The fluid-cooled battery pack system according to claim 13, wherein the gaseous coolant is air.

16. The fluid-cooled battery pack system according to claim 15, wherein the coolant transport device includes a cooling fan.

17. The fluid-cooled battery pack system according to claim 16, wherein the cooling fan is placed at the coolant inlet and supplies fresh air into the battery pack case.

18. The fluid-cooled battery pack system according to claim 16, wherein the cooling fan is placed at the coolant outlet and draws heated air out of the battery pack case.

* * * * *